United States Patent
Rulison

(10) Patent No.: US 6,383,679 B1
(45) Date of Patent: *May 7, 2002

(54) SELF-TUNING CHARGE CONTROLLER FOR NICKEL HYDROGEN BATTERIES

(75) Inventor: Aaron J. Rulison, Sunnyvale, CA (US)

(73) Assignee: Space Systems/Loral, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,529

(22) Filed: Nov. 10, 1999

(51) Int. Cl.$^7$ ............................................... H01M 10/44
(52) U.S. Cl. ........................... 429/50; 429/120; 429/62; 320/35
(58) Field of Search ..................... 429/223, 61, 62, 429/90, 91, 50, 52, 120; 29/623.1; 320/35, 21, 22

(56) References Cited

U.S. PATENT DOCUMENTS

| | | | |
|---|---|---|---|
| 5,395,706 A | 3/1995 | Hall | 429/50 |
| 5,429,888 A | 7/1995 | Hall | 429/50 |
| 5,617,006 A * | 4/1997 | Lenhart et al. | 320/21 |
| 5,623,195 A * | 4/1997 | Bullock et al. | 320/22 |
| 5,874,824 A * | 2/1999 | Lee et al. | 320/130 |
| 5,990,662 A * | 11/1999 | Yang | 320/130 |
| 6,054,842 A * | 4/2000 | Verzwyvelt et al. | 320/135 |

* cited by examiner

Primary Examiner—Gabrielle Brouillette
Assistant Examiner—R. Alejandro
(74) Attorney, Agent, or Firm—Perman & Green, LLP

(57) ABSTRACT

After discharge, a rechargeable battery having a nickel hydroxide positive electrode is charged at a temperature $T_1$ between a proximately $-10°$ C. and $-30°$ C., lower than a temperature $T_2$, in the range of approximately $-15°$ C. to $+5°$ C., at which discharge begins, automatically determining the total charge to be returned to the battery for establishing the ideal charge for the battery leading into the next discharge cycle, and applying charge energy to the battery having the magnitude as automatically determined. After discharge, the battery is cooled into the $T_1$ range, then heated to stabilize the temperature to that in the $T_1$ range. Then the battery is charged according to a nominal profile of charge power as a function of time, the accumulated charge imparted to the battery sensed as cooling proceeds, the nominal power profile adjusted according to the accumulated charge obtained, and the remainder of the nominal charge profile adjusted accordingly.

6 Claims, 5 Drawing Sheets

SELF-TUNING CHARGE CONTROLLER FOR NICKEL HYDROGEN BATTERIES

BACKGROUND OF THE INVENTION

1. Field of the Invention

The present invention relates generally to a technique for operation of a nickel-hydrogen battery, and more particularly, to recharging a nickel-hydrogen battery at a temperature which is substantially lower than the temperature at which discharge is performed, automatically correcting errors in the total charge returned to the battery during recharge to thereby establish the ideal battery charge and temperature leading into the next discharge cycle.

2. Description of the Prior Art

Commonly assigned U.S. Pat. No. 5,395,706 entitled "Satellite Battery Thermal/Capacity Design" and U.S. Pat. No. 5,429,888, entitled "Battery Recharging Technique" both relate to recharging a nickel-hydrogen battery at a temperature which is substantially lower than the temperature at which discharge is performed. The disclosures of these patents are incorporated into the instant disclosure in their entirety by reference. According to these patents, the charging operation uses preset high, medium, taper, and pulse charge rates. The battery's temperature is made to follow a prescribed temperature profile throughout. Beginning at the transition from high to medium charging, heater power is required to keep the batteries at their cold charge temperature setpoint, which typically is −20° C. In charging the battery, about half way through taper charge, the heater power falls to zero. This marks a transition in the battery charging thermodynamics and roughly corresponds to the point at which the batteries reach a substantial fraction of their total charge capacity. Note that throughout the heater power transition, the battery's temperature remains at the setpoint of 20° C. From the heater power transition onward, much of the charge power is dissipated as heat, rather than absorbed as useful energy capacity. There is, therefore, a slight rise in the battery temperature during the last portion of taper charging. At the end of taper charging, the temperature setpoint is changed to −15° C. (typically) in preparation for battery discharge. There is an associated rise in heater power after the end of taper charge.

The prior art in the form of the U.S. Pat. Nos. 5,395,706 and 5,429,888 just described is based on a feed-forward controller which does not use information about the battery's temperature, voltage, or pressure during recharge. Instead, it simply applies charge energy to the battery in proportion to the energy lost by the battery during the most recent discharge.

The primary advantage of the present invention over the prior art is that it eliminates the labor Intensive and risky manual tuning process required to achieve optimal battery charge and thermal behavior. The prior art cited above has no ability and makes no attempt to automatically correct errors in the total charge returned to a battery during recharge. Such errors in the total charge arise inevitably from the power control electronics surrounding the battery, including battery charge and discharge current monitor calibration and measurement errors, and charge controller errors, Errors also arise from uncertainties in the theory of thermal dissipation and charge acceptance efficiency that leads to the prescribed charge currents. For digital systems, errors also arise from discretization of the total charge to be returned. Furthermore, the battery temperature near the end of recharge is very sensitive to these errors. As a result of this sensitivity, with the prior art the particular charge control parameters must be manually tuned in order to achieve adequate performance for each spacecraft. This tuning process is labor intensive and, for satellite applications, risky since the tuning process can only be done once the satellite is experiencing actual eclipses on orbit. Furthermore, in the prior art one manual tuning procedure may not be adequate over the spacecraft's entire life due to drifting electronic component performance.

It was with knowledge of the foregoing state of the technology that the present invention has been conceived and is now reduced to practice.

SUMMARY OF THE INVENTION

The present invention relates to a method of operating a rechargeable battery having a nickel hydroxide positive electrode and an electrolyte. This method comprises the steps of charging the battery, after completion of a discharge cycle, at a temperature $T_1$ between approximately −10° C. and −30° C. which is lower than a temperature $T_2$, in the range of approximately −10° C. to +5° C., at which discharge begins, automatically determining the total charge to be returned to the battery for establishing the ideal charge and temperature for the battery leading into the next discharge cycle, and applying charge energy to the battery having the magnitude as automatically determined. After completion of the discharge cycle, the battery is cooled to the temperature in the $T_1$ range, then heated to stabilize the temperature to that in the $T_1$ range. Then the battery is charged according to a nominal profile of charge power as a function of time, the accumulated charge imparted to the battery sensed as cooling proceeds, the nominal power profile adjusted according to the accumulated charge obtained, and the remainder of the nominal charge profile adjusted accordingly. More specifically, the battery is heated according to a nominal profile of heater power as a function of time which includes an upward transition portion for initializing the heating operation, a plateau portion for maintaining the heating operation, and a downward transition portion for terminating the heating operation, and the actual downward transition in heater power obtained is sensed, and the nominal power profile is adjusted according to the time of the actual downward transition sensed. This results in decreasing the total charge energy returned to the battery in the event the downward transition operation sensed actually occurs prior to the nominal transition time and results in increasing the total charge returned to the battery in the event the downward transition operation sensed actually occurs after the nominal transition time operation.

A primary feature, then, of the present invention is the provision of an improved technique for operation of a nickel-hydrogen battery.

Another feature of the present invention is the provision of such a technique for recharging a nickel-hydrogen battery at a temperature which is substantially lower than the temperature at which discharge is performed and automatically correcting errors in the total charge returned to the battery during recharge to thereby establish the ideal battery charge and temperature leading into the next discharge cycle.

A further feature of the present invention is the provision of such a technique which incorporates use of temperature controller information in a nickel hydrogen battery charge controller.

Still another feature of the present invention is the provision of such a technique which automatically tunes the total charge returned to the battery thereby correcting all of the error sources to which the battery is subjected, thereby establishing the ideal battery charge and temperature leading into the next discharge cycle.

Yet another feature of the present invention is the provision of such a technique which renders the known labor intensive and risky manual tuning process largely obsolete.

Yet another feature of the present invention is the provision of such a technique which eliminates the possibility of overcharging, and hence, overheating, nickel-hydrogen batteries during recharge after discharge and which, in turn, may lengthen the battery's operational lifetime.

Still another feature of the present invention is the provision of such a technique which, for satellite applications, serves to improve the satellite's overall lifetime and reliability.

Still a further feature of the present invention is the provision of such a technique which eliminates the possibility of undercharging nickel-hydrogen batteries during recharge after discharge which, in turn, protects against (1) inadequate battery energy capacity in the next discharge period and (2) catastrophic battery failure due to cell fusion and, for satellite applications, protects against forced payload turnoffs, or load shedding, and prevents service interruptions.

Yet a further feature of the present invention is the provision of such a technique which greatly reduces the labor required to tune charge control parameters, using the same parameter set for all batteries of a given capacity and thermal environment, for satellite applications, there being one parameter set for all spacecraft in a given class and there being no need to manually tune each spacecraft's battery software parameters after launch, a risky and costly procedure, and there being no need to retune the software parameters as the spacecraft ages.

Still another feature of the present invention is the provision of such a technique which uses a temporal setpoint for a temperature controller output transition and subsequent temporal shift of charge currents to optimally adjust total charge returned to the battery and the battery's temperature before the next discharge period.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
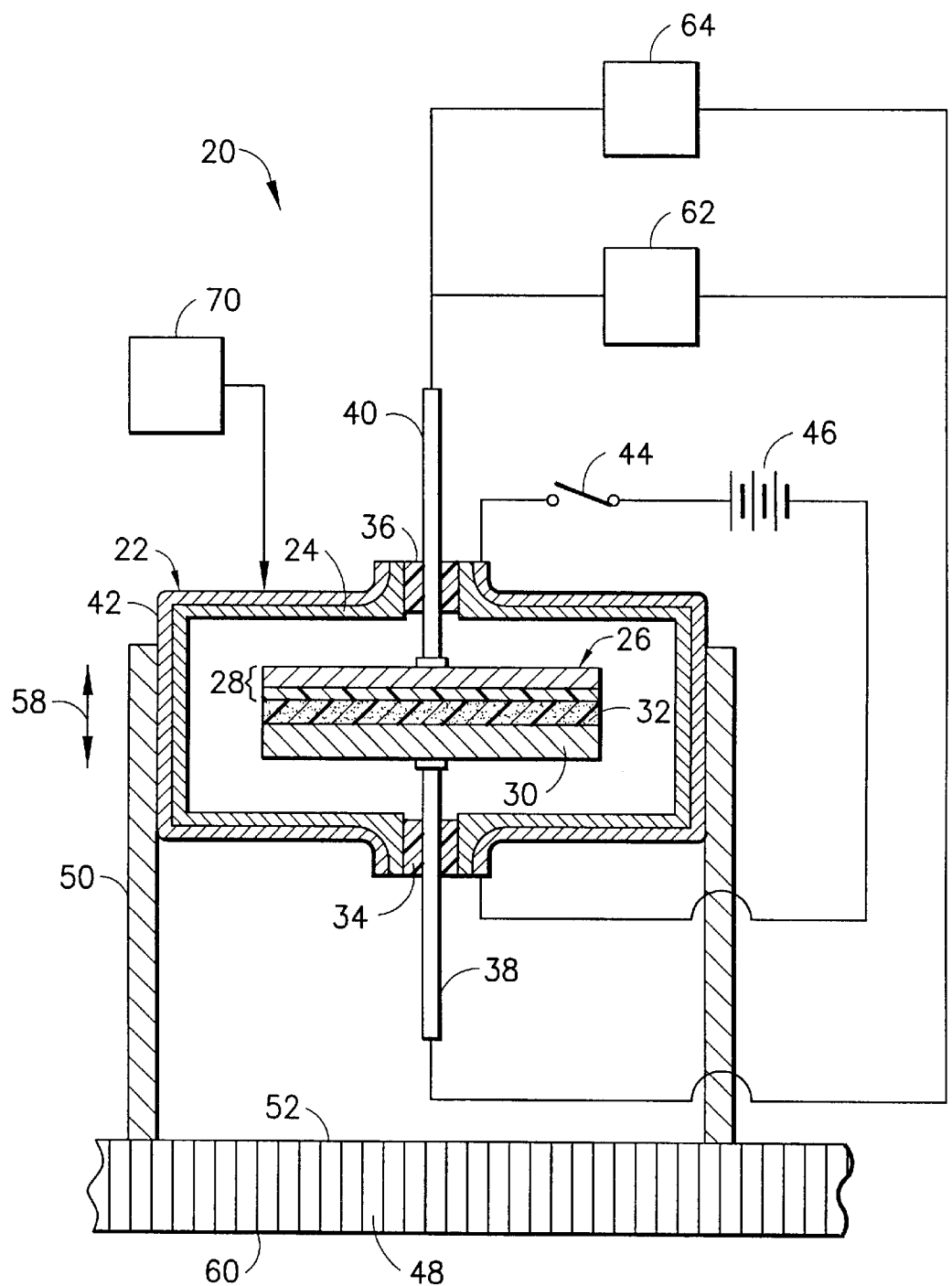
FIG. 1 is a diagrammatic representation of a known nickel-hydrogen battery system of the type disclosed in U.S. Pat. Nos. 5,395,706 and 5,429,888.

Turn now to the drawings and, initially, to FIG. 1 which generally illustrates a nickel-hydrogen battery system 20 of the type with which the invention is concerned. The battery system 20 includes a cell 22 provided with a pressure vessel 24 and an electrode stack 26 within the pressure vessel. The electrode stack 26, in turn, includes a positive electrode 28, a negative electrode 30, and a porous separator 32 which also serves as an electrolyte reservoir for storing excess electrolyte within the electrode stack 26. The porous separator 32 may be composed of zirconia, asbestos, plastic, and the like. The positive electrode 28 includes electrochemically active nickel hydroxide and electrically conductive material having a resistivity less than approximately 0.1 ohm/cm. The negative electrode 30 is of a material which catalyzes the oxidation and reduction of hydrogen gas and, in typical fashion, the electrolyte is a solution of potassium hydroxide (KOH).

The cell 22 also has electrical lead throughs 34, 36 through which negative and positive electrical leads 38, 40 respectively pass.

A suitable electrically energized heater jacket 42 overlies the pressure vessel 24. By closure of a switch 44, heating elements within the heater jacket 42 can be energized by a suitable source 46 of EMF for heating the cell 22.

The cell 22 is thermally connected to an optical space radiator (OSR) 48 via a thermally conductive sleeve 50. The sleeve 50 is mounted on one side 52 of the OSR 48 and slidably envelops an outer peripheral surface 54 of the cell 22. A side 60 of the OSR 48 opposite side 52 faces black space. The cell is continuously cooled by the OSR and its temperature is determined by bucking the OSR with the heater jacket 42.

On a spacecraft which is a preferred venue for the cell 22, a solar array 62 is the primary power source indicated for recharging the cell 22 and a typical load 60 is indicated for the discharge cycle of the cell. While the present disclosure is written in the context of spacecraft applications, other applications of nickel hydrogen batteries would also benefit from the invention.

Figure 2:
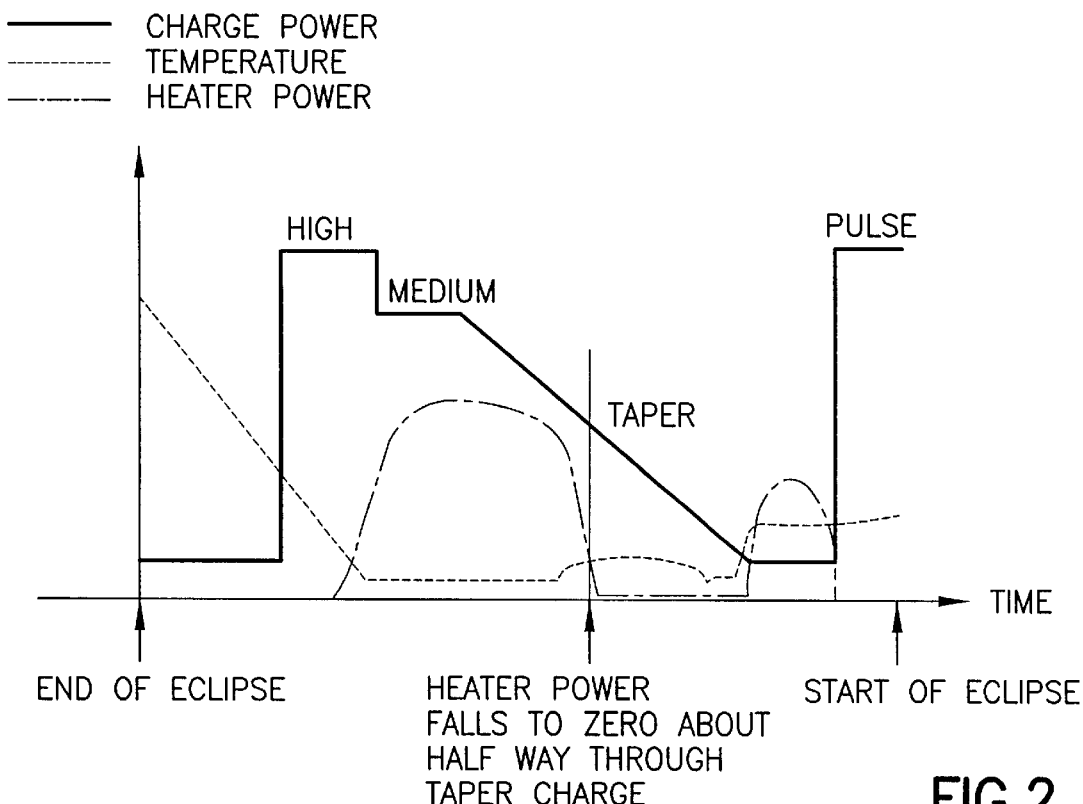
FIG. 2 is a graph depicting the operation of a cell of the known battery system of FIG. 1, presenting various parameters over the course of time.

FIG. 2 is a graph showing features of a well-tuned cold charging recharge cycle, the basis of which is described in U.S. Pat. No. 5,395,706 entitled "Satellite Battery Thermal/ Capacity Design" and U.S. Pat. No. 5,429,888 entitled "Battery Recharging Technique". The charging includes preset high, medium, taper, and pulse charge rates. The battery's temperature is made to follow a prescribed temperature profile throughout. Beginning at the transition from high to medium charging, heater power is required to keep the batteries at their cold charge temperature setpoint, which typically is −20° C., It will be appreciated that heat from batteries used in space applications is radiated to deep space. About half way through taper charge, the heater power falls to zero. This marks a transition in the battery charging thermodynamics and roughly corresponds to the point at which the batteries reach a substantial fraction of their total charge capacity. Note that throughout the heater power transition, the battery's temperature remains at the setpoint of −20° C. From the heater power transition onward, much of the charge power is dissipated as heat, rather than absorbed as useful energy capacity. There is, therefore, a slight rise in the battery's temperature during the last portion of taper charging. At the end of taper charging, the temperature setpoint is changed to −15° C. (typically) in preparation for battery discharge. There is an associated rise in heater power after the end of taper charge.

Figure 3:
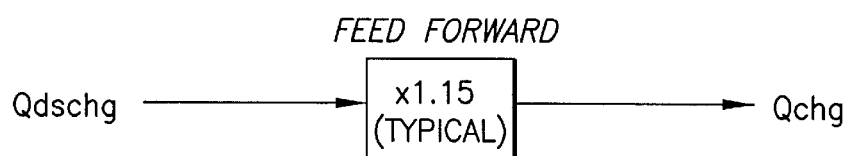
FIG. 3 is a schematic diagram illustrating the operation of a feed-forward charge controller used with the known battery system of FIG. 1.

The prior art being described here in FIG. 2 is based on a feed-forward charge controller. FIG. 3 illustrates the concept. The feed-forward method does not use information about the battery's temperature, voltage, or pressure during recharge. Instead, it simply applies charge energy to the battery in proportion to the energy lost (for example, 115%) by the battery during the most recent discharge.

Figure 4:
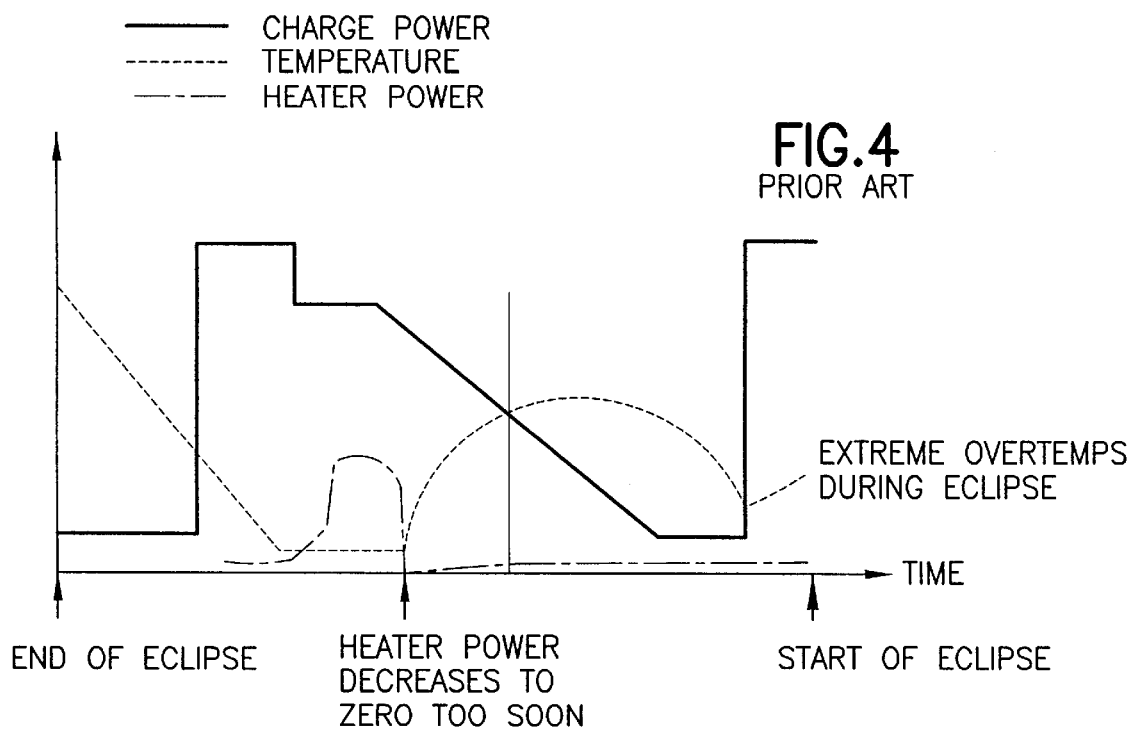
FIG. 4 is a graph depicting the operation of a cell of the known battery system of FIG. 1 which undesirably leads to battery overcharge.

FIG. 4 shows how the prior art may lead to battery overcharge. This occurs when the total charge energy applied to the battery is excessive. Such excessive charge energy may be due to errors that can arise from the power control electronics surrounding the battery or from uncertainties in the theory that leads to the prescribed charge energy. In FIG. 4, the heater power transition occurs prior to its nominal time. Since there still is a substantial amount of recharge power left in the charge cycle and since, from the heater power transition onward, most of the charge power is dissipated as heat, there is a highly undesirable temperature rise prior to the next eclipse.

Figure 5:
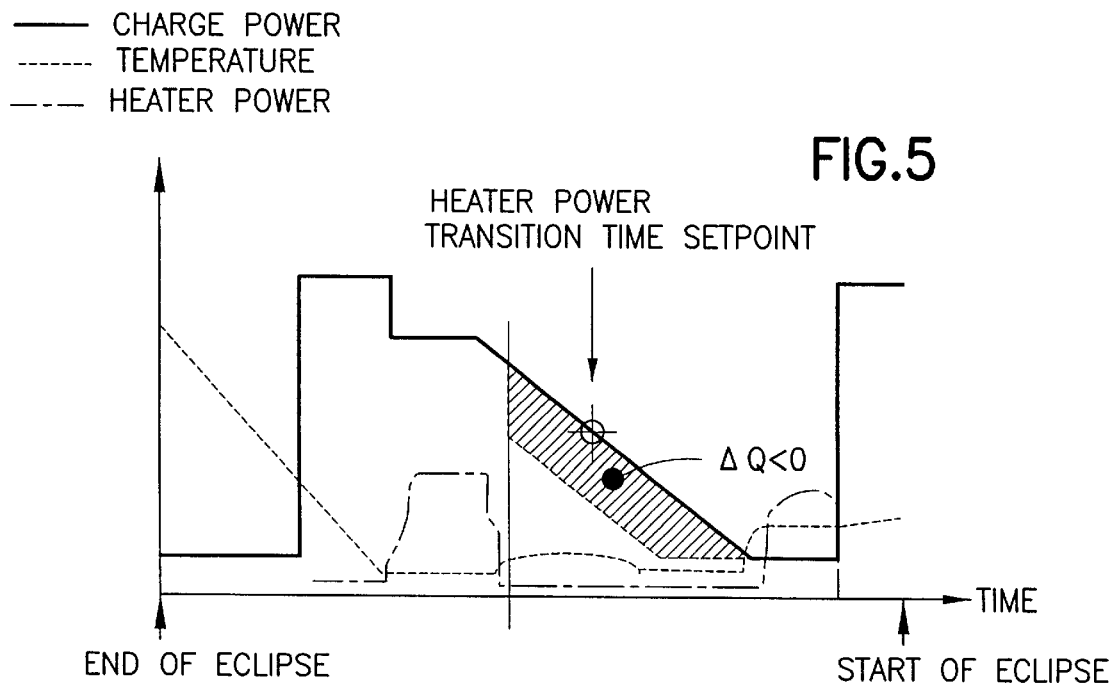
FIG. 5 is a graph depicting the operation of a cell of an improved battery system embodying the invention which desirably avoids battery overcharge.

FIG. 5 illustrates an aspect of the present invention that enables the charge controller to automatically correct and prevent the incipient overcharge. At the transition from high to medium charge power, the novel charge controller begins watching watches for a downward transition in the heater power, which would indicate the battery is nearly fully charged. When it detects a downward transition that occurs prior to the nominal transition time, the novel controller automatically reduces the charge power to correspond to that which would have been in force had the transition occurred at the nominal time. It then completes the remainder of the nominal charge profile. In this manner, an amount of charge energy, ΔQ, is automatically subtracted from the total charge returned to the battery, and the overcharge is avoided.

Figure 6:
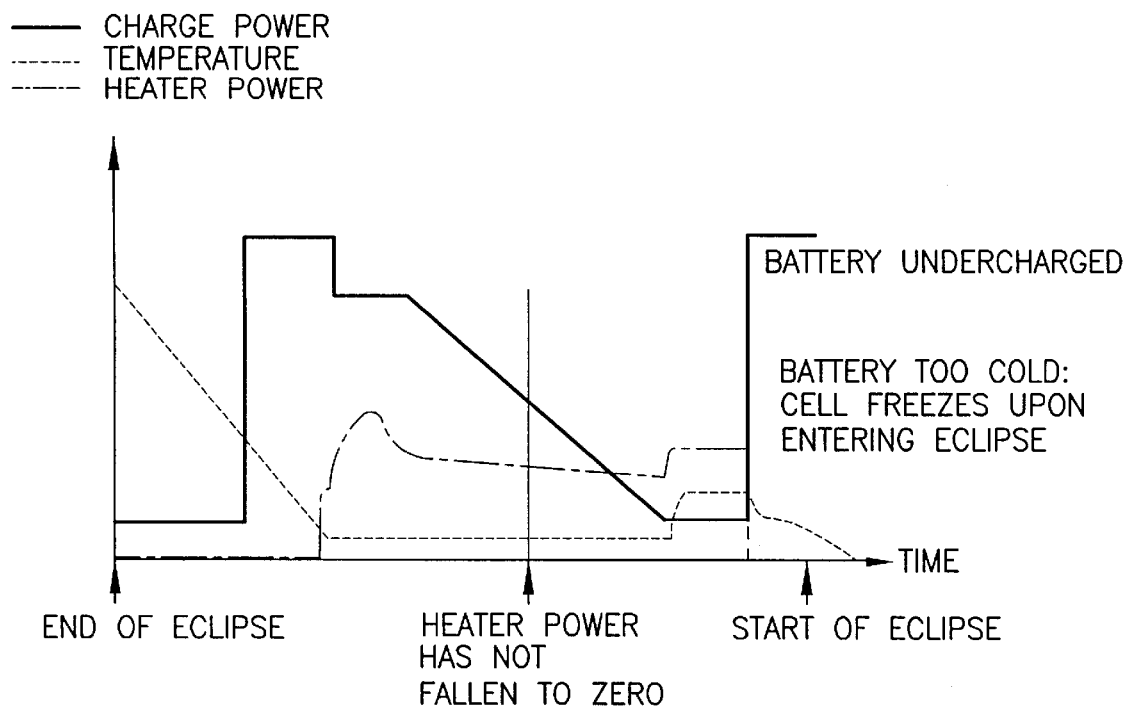
FIG. 6 is a graph depicting the operation of a cell of the known battery system of FIG. 1 which undesirably leads to battery undercharge.

FIG. 6 illustrates how the prior art may lead to battery undercharge, in which the total charge energy applied to the battery is insufficient, due to errors that can arise from the power control electronics surrounding the battery or from uncertainties in the theory that leads to the prescribed charge energy. In FIG. 6, the heater power did not occur at the nominal time. As a result, the battery is undercharged for the next eclipse and unable to supply the spacecraft's power needs. Moreover, the thermodynamics are such that at the pulse charge (the last step in the charge cycle), the battery's temperature can be driven downward to a temperature at which catastrophic battery failure can occur within seconds of entering the eclipse.

Figure 7:
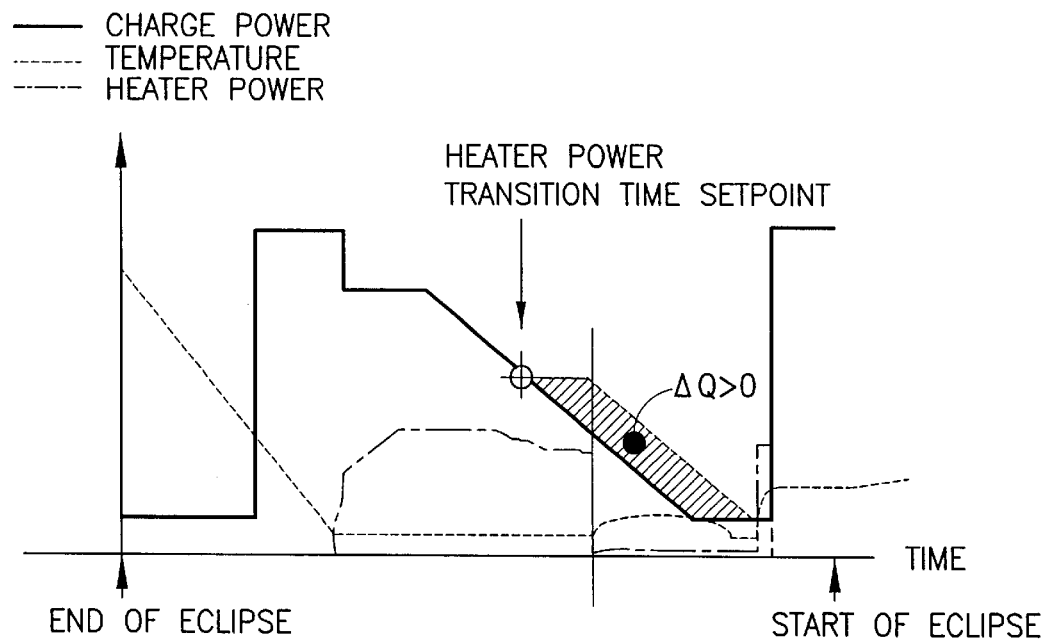
FIG. 7 is a graph depicting the operation of a cell of an improved battery system embodying the invention which desirably avoids battery undercharge.

FIG. 7 illustrates an aspect of the present invention that enables the charge controller to automatically correct and prevent the incipient undercharge. At the transition from high to medium charge power, the novel charge controller begins watching for a downward transition in the heater power, which would indicate the battery is nearly fully charged. When it observes a lack in downward transition prior to the nominal transition time, the novel charge controller automatically maintains the charge power corresponding to that which would have been in force had the transition occurred at the nominal time until the downward heater power transition occurs. It then completes the remainder of the nominal charge profile. In this manner, an amount of charge energy ΔQ is automatically added to the total charge returned to the battery, and the undercharge is avoided.

Figure 8:
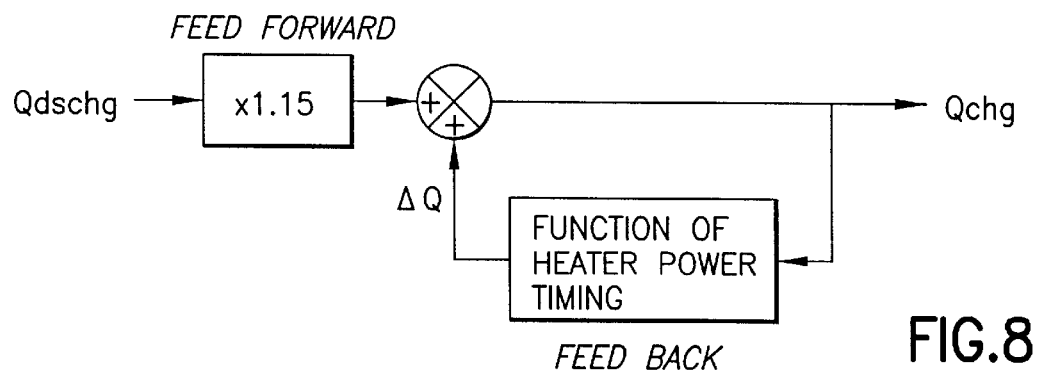
FIG. 8 is a schematic diagram illustrating the operation of a feed-forward charge controller used with the improved battery system of the invention.

FIG. 8 illustrates the novel charge controller of the invention. It relates how the invention builds on the feed-forward design of the prior art by adding a feedback loop that uses information about the time of downward transition of heater power that occurs when the battery is nearing full charge. The ΔQ in FIG. 8 corresponds to the same symbol in FIGS. 5 and 7).

Figure 9:
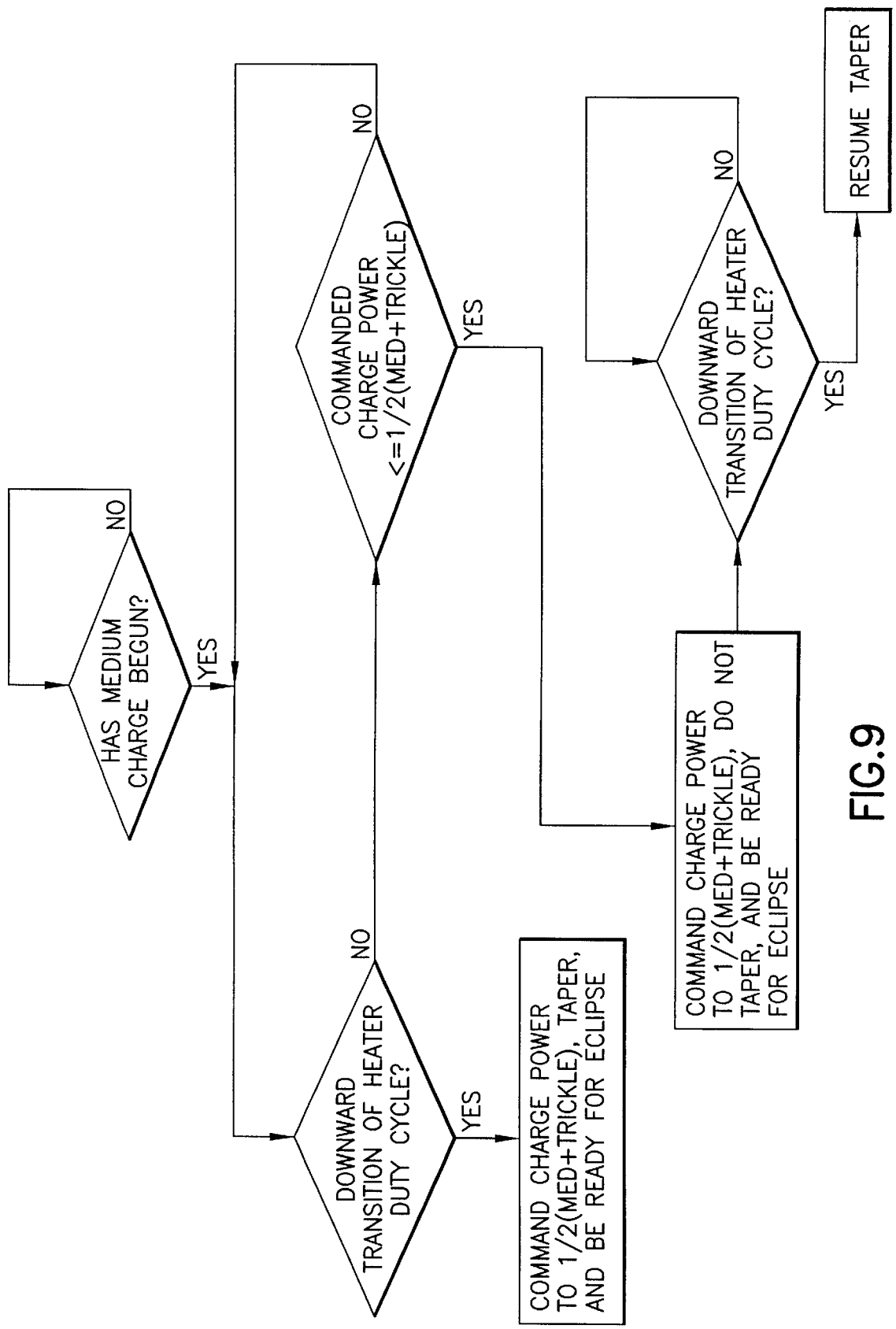
FIG. 9 is a flow chart which relates the procedure employed by a battery system embodying the invention.

The flow chart presented in FIG. 9 relates the entire procedure just described.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of operating a rechargeable battery subject to charge control parameters comprising a nickel hydroxide positive electrode and an electrolyte comprising the steps of:
   (a) after completion of a discharge cycle, charging the battery at a temperature $T_1$ between approximately −10° C. and −30° C. which is lower than a temperature $T_2$, in the range of approximately −15° C. to +5° C., at which discharge begins;
   (b) automatically and without manually tuning the charge control parameters determining a total charge to be returned to the battery for establishing an ideal charge and temperature for the battery leading into the next discharge cycle; and
   (c) applying charge energy to the battery having the magnitude determined in step (b).

2. A method of operating a rechargeable battery as set forth in claim 1 wherein step (a) includes the steps of:
   (d) after completion of the discharge cycle, cooling the battery to the temperature in the $T_1$ range;
   (e) heating the battery to stabilize the temperature so that in the $T_1$ range;
   (f) charging the battery according to a nominal profile of charge power as a function of time; and
wherein steps (b) and (c) include the steps of:
   (g) sensing an accumulated charge imparted to the battery as step (f) proceeds;
   (h) adjusting the nominal power profile of step (f) according to the accumulated charge in step (g); and
   (i) completing the remainder of the nominal charge profile adjusted according to step (h).

3. A method of operating a rechargeable battery as set forth in claim 2
   wherein step (e) includes the steps of:
   (j) heating the battery according to a nominal temperature profile as a function of time which includes an upward transition in heater power for arresting the battery cool down; a plateau in heater power for maintaining the battery temperature at the setpoint; and a downward transition in heater power before the battery begins to warm and (k) sensing the actual downward transition in heater power obtained as a result of step (j); and (l) performing step (h) according to the time of the actual downward transition sensed in step (k).

4. A method of operating rechargeable battery as set forth in claim 3 wherein step (h) results in decreasing the applied charge power in step (f) in the event the downward transition operation sensed in step (k) actually occurs prior to the nominal transition time; and wherein step (h) results in increasing the applied charge power in step (f) in the event the downward transition operation sensed in step (k) actually occurs after the nominal transition time operation.

5. A rechargeable battery subject to charge control parameters comprising:

a nickel hydroxide positive electrode;

an electrolyte; and a negative electrode comprised of hydrogen;

means for charging the battery at a temperature $T_1$ between approximately −10° C. and −30° C. which is lower than a temperture $T_2$, in the range of approximately −10° C. to +5° C., at which discharge begins; and a charge controller for automatically and without manually tuning the charge control parameters determining a total charge to be returned to the battery for establishing an ideal charge and temperature for the battery leading into the next discharge cycle and for applying only the necessary magnitude of charge energy to the battery to assure such ideal charge and temperature are obtained.

6. A rechargeable battery as set forth in claim 5 including:

a source of refrigeration for cooling the battery to a temperature $T_1$ between approximately −10° C. and −30° C.

* * * * *